United States Patent [19]
Tillotson et al.

[11] Patent Number: 5,409,683
[45] Date of Patent: Apr. 25, 1995

[54] METHOD FOR PRODUCING METAL OXIDE AEROGELS

[75] Inventors: Thomas M. Tillotson, Tracy; John F. Poco, Livermore; Lawrence W. Hrubesh, Pleasanton; Ian M. Thomas, Livermore, all of Calif.

[73] Assignee: Regents of the University of California, Oakland, Calif.

[21] Appl. No.: 272,432

[22] Filed: Jul. 7, 1994

Related U.S. Application Data

[63] Continuation of Ser. No. 967,495, Oct. 28, 1992, abandoned, which is a continuation-in-part of Ser. No. 754,349, Sep. 5, 1991, Pat. No. 5,275,796.

[51] Int. Cl.$^6$ ............................................. C01B 33/12
[52] U.S. Cl. ............................... 423/338; 252/315.6
[58] Field of Search ........................ 423/335, 338; 106/287.34; 501/12, 233; 252/315.1, 315.5, 315.6, 315.7

[56] References Cited

U.S. PATENT DOCUMENTS

| | | | |
|---|---|---|---|
| 3,846,337 | 9/1974 | Young | 252/437 |
| 3,867,279 | 2/1975 | Young | 208/114 |
| 4,327,065 | 4/1982 | von Dardel et al. | 423/338 |
| 4,402,927 | 9/1983 | von Dardel et al. | 423/335 |
| 4,667,417 | 5/1987 | Graser et al. | 34/9 |
| 4,954,327 | 9/1990 | Blount | 423/338 |

Primary Examiner—Olik Chaudhuri
Assistant Examiner—Ken Horton
Attorney, Agent, or Firm—Henry P. Sartorio; Daryl S. Grzybicki

[57] ABSTRACT

A two-step hydrolysis-condensation method was developed to form metal oxide aerogels of any density, including densities of less than 0.003g/cm$^3$ and greater than 0.27g/cm$^3$. High purity metal alkoxide is reacted with water, alcohol solvent, and an additive to form a partially condensed metal intermediate. All solvent and reaction-generated alcohol is removed, and the intermediate is diluted with a nonalcoholic solvent. The intermediate can be stored for future use to make aerogels of any density. The aerogels are formed by reacting the intermediate with water, nonalcoholic solvent, and a catalyst, and extracting the nonalcoholic solvent directly. The resulting monolithic aerogels are hydrophobic and stable under atmospheric conditions, and exhibit good optical transparency, high clarity, and homogeneity. The aerogels have high thermal insulation capacity, high porosity, mechanical strength and stability, and require shorter gelation times than aerogels formed by conventional methods.

25 Claims, 7 Drawing Sheets

METHOD FOR PRODUCING METAL OXIDE AEROGELS

The United States Government has rights in this invention pursuant to Contract No. W-7405-ENG-48 between the United States Department of Energy and the University of California for the operation of Lawrence Livermore National Laboratory.

This is a Continuation of application Ser. No. 07/967,495 filed Oct. 28, 1992, now abandoned, which is a continuation-in-part of U.S. patent application Ser. No. 07/754,349, filed Sept. 5, 1991, "A Method for Producing Metal Oxide Aerogels Having Densities Less than 0.02 g/cm$^3$," now U.S. Pat. No. 5,275,796.

BACKGROUND OF THE INVENTION

FIELD OF THE INVENTION

The present invention relates to a method for making metal oxide aerogels and porous glasses. In particular, the invention is a two-step process in which a condensed metal oxide intermediate is formed, and from which aerogels are made having any selected density, with high clarity, thermal insulative capacity, moisture stability, and strength.

Metal oxide aerogels are ultra-light, highly porous forms of metal oxide glass, with densities only slightly greater than air. The first aerogels, made in the 1930's, were scientific curiosities whose unique and strange properties were not immediately exploited for practical purposes. Decades later, aerogels found a practical application in a highly specialized area—the detection of charged particles in high-energy physics experiments. Today, the potential applications for aerogels are numerous and diverse. Their unique properties make them especially useful for a variety of applications that require transparency, low thermal conductivity, and strength with very low weight.

Aerogels are generally transparent and have a thermal conductivity about 100 times less than conventional non-porous glass. Because of their transparency and excellent insulating properties, aerogels could be used as superinsulating materials in walls, windows, refrigerators, boilers, boiler houses and steam pipes, or passive solar collectors. Aerogels also have mechanical strength and are good sound and shock absorbers. Sound transmission through aerogels is slower than through air, and the acoustic impedance of aerogels falls between that of most sound transducers and air. Aerogels could be used to improve the efficiency of transducers used in micro-speakers and distance ranging. Aerogels have low dielectric losses and would make excellent substrates and supports for electronic circuits, especially microwave.

The extremely low densities of aerogels, coupled with their mechanical strength, suggest a host of applications as materials for engine and body parts of automobiles, aircraft, and spacecraft. Aerogels would be useful as packaging materials and have the added advantage of being environmentally friendly and non-toxic, unlike typical plastics and Styrofoam, which release CFCs. Aerogels also have a smoky, ghostly appearance and can be colored with dopants, lending an aesthetic quality to the materials that is desirable for more artistic uses, such as novelty or craft items, and toys. These dispersed dopants could have useful applications in which the aerogel acts as a host matrix. Examples include dye doped aerogels, which could be used as laser rods, and metal doped aerogels, which could catalyze specific chemical reactions.

Two general reactions are used to make metal (M) oxide aerogels:

A metal alkoxide is hydrolyzed by reacting with water and an alcohol in the presence of a catalyst. The hydrolyzed metal undergoes a condensation reaction, forming a metal oxide gel, from which solvents are extracted to form an aerogel.

The first aerogels were translucent pieces of porous silica glass made by S. S. Kistler (*Nature* 127:741 (1931); U.S. Pat. No. 2,249,767). The aerogels were prepared by forming silica 'hydrogels', which were exchanged with alcohol and dried with little shrinkage. When the alcohol was supercritically extracted from the wet gel at high temperatures and pressures, the resulting aerogel had a density of about 0.05 g/cm$^3$, or 98% porosity. Kistler's process was time consuming and laborious, and subsequent advances in the art have reduced the processing time and increased the quality of aerogels.

An improvement over Kistler's method was described by Teichner et al. (U.S. Pat. No. 3,672,833). The single step sol-gel process uses a silicon alkoxide such as tetraethoxysilane (TEOS) or tetramethoxysilane (TMOS). The silicon alkoxide is hydrolyzed by one to ten times the stoichiometric quantity of water with an alcohol solvent in an acid, neutral, or basic medium. The hydrolysis reaction is followed by condensation, in which the hydrolysis products polymerize to form a gel.

In Teichner's method, the wet gel contains reaction-generated alcohol, and therefore the slow process of exchanging solvents before drying, as in Kistler's method, is unnecessary. The alcohol is removed directly from the wet gel by exposure to temperatures and pressures above the alcohol's supercritical point. These conditions re-esterify the aerogel surfaces, making the material hydrophobic and stable when exposed to atmospheric moisture (U.S. Pat. No. 2,680,696 by E. C. Broge).

In Teichner's method, the wet gel contains reaction-generated alcohol, and therefore the slow process of exchanging solvents before drying, as in Kistler's method, is unnecessary. The alcohol is removed directly from the wet gel by exposure to temperatures and pressures above the alcohol's supercritical point. These conditions re-esterify the aerogel surfaces, making the material hydrophobic and stable when exposed to atmospheric moisture (U.S. Pat. No. 2,680,696 by E. C. Broge).

The silica aerogels made by the Teichner process have improved properties of transparency and strength over those produced from Kistler's method. However, the aerogels produced by the method of the present invention have an even greater range of densities and substantially improved physical properties of clarity, strength, moisture stability, and insulative capacity.

S. Henning and L. Svensson further improved aerogel synthesis methods by developing a commercial process (*Phys. Scripta* 23:698 (1982); U.S. Pat. No. 4,402,927 by von Dardel et al). A silicon alkoxide, tetramethoxysilane (TMOS), is reacted with water in the presence of a basic catalyst (NH₄OH) in a single mixing step:

4CH₃OH (hydrolysis);

The condensation reaction immediately follows hydrolysis in the same reaction vessel.

Conventional silica aerogel glasses have distinguishable microstructures that are characteristic of the particular reaction process used for their formation. The microstructure of the aerogel made by the Henning process is composed of spherical primary particles linked to form a 'colloidal' network resembling strands of pearls randomly crosslinked together and surrounded by the reaction-generated alcohol. The reaction rates of the hydrolysis and condensation steps ultimately determine the microstructure of the gel (R. K. Iler, *The Chemistry of Silica*, Wiley Interscience, New York, 1979, and D. W. Schaefer, *Science* 243:1023 (1989)). The reaction rates, in turn, strongly depend on the pH, which is adjusted by the addition of base catalyst.

Aerogels made by conventional techniques have a maximum bulk density limit. Conventional silica aerogels made by the single-step hydrolysis-condensation reactions given in Equations [3] and [4] have densities in the range of 0.05–0.27 g/cm³. The density range of conventional aerogels described in other references is about 0.04–0.3 g/cm³ (Teichner et al., U.S. Pat. No. 3,672,833; von Dardel et at., U.S. Pat. No. 4,402,927; and Zarzycki et al., U.S. Pat. No. 4,432,956). Stoichiometric and miscibility considerations limit the expected maximum bulk density of silica aerogels to about 0.3 g/cm³.

In conventional practice, aerogels of low densities are obtained by dilution of the initial condensed metal oxide solution with alcohol. However, the higher the dilution, the longer the gelation time. Dilution considerably slows the hydrolysis rate, which significantly increases the overall gelation time. At some maximum dilution level, the reverse equilibrium reactions will inhibit gelation, thereby setting the minimum density limit for low density aerogels. To form an aerogel with a density of 0.02 g/cm³ using such a dilution method, as many as 14 days is required for the solution to gel completely. The present invention improves on the conventional techniques by forming a partially hydrolyzed, partially condensed metal intermediate, which can produce aerogels with densities extending beyond the conventional limits, with significantly shorter gelation times.

Aerogels are generally transparent when prepared by the conventional single-step method. However, a loss in clarity occurs in aerogels having a density less than 0.04 g/cm³. This loss of transparency in low density aerogels is caused by light scattering from pores that have diameters greater than 100 nm (visible wavelengths).

Tewari et al. describe an improved process for making silica aerogels in a single-step hydrolysis-condensation reaction of silicon alkoxide to form an "alcogel" (U.S. Pat. No. 4,610,863, "Process for Forming Transparent Aerogel Insulating Arrays"). The alcohol generated in the reaction is removed by substitution with liquid $CO_2$, which is then removed by supercritical drying of the alcogel. Tewari et al. suggest that substitution of $CO_2$ for the alcohol solvent will allow removal of solvent at less severe conditions of temperature and pressure.

The single-step Tewari process produces aerogels containing 5% silica, which corresponds to a density of 0.11 g/cm³. The chemistry of the Tewari method limits the attainable aerogel density range from about 0.02 g/cm³ to 0.3 g/cm³. Also, supercritical extraction of $CO_2$ solvent following exchange with alcohol produces an aerogel with hydrophilic surfaces. Hygroscopic attraction of moisture to the surfaces of the aerogel leads to instability and eventual collapse of the aerogel structure if exposed to atmospheric moisture.

The microstructure and chemical properties of the dried aerogel are determined by its precursor chemistry. The precursor chemistry is controlled by several variables: the use of catalysts to adjust the pH of the reacting solutions, the amount of water used in the reactions, the use of additives to control polymerization rates, and the reaction sequence. For example, the microstructure of a single-step, base catalyzed hydrolysis-condensation of silicon alkoxide is a colloidal gel, whereas the acid catalyzed reaction leads to a polymeric gel.

The importance of the reaction sequence was demonstrated by Brinker et al., using a two-step process for making silica gels from which high density "xerogels" resulted after evaporative drying (*J. Non-Cryst. Sol.* 48:47 (1982)). The first step of the Brinker process involves the acid catalyzed hydrolysis of silicon alkoxide using a substoichiometric amount of water required to fully hydrolyze the silicon alkoxide. This first step produces a partially hydrolyzed, partially condensed silica in alcohol solution, in which the presence of alcohol limits continued condensation by affecting the reverse equilibrium reactions. The sol from this step could be characterized as consisting of clusters of polymeric silica chains.

The second step involves the base catalyzed completion of the hydrolysis-condensation reaction, where condensation continues until gelation occurs. The microstructure of the final gel made from this two-step process is more highly cross-linked and generally stronger than a single-step process gel.

Schaefer et al. describe a modified two-step process in which some of the reaction-generated alcohol of the first step is removed from the reaction by distillation, leaving a partially condensed silica intermediate (*Physics and Chemistry of Porous Media II*, J. R. Banavar, J. Koplik and K. W. Winkler, Eds. AIP New York (1987), pp. 63–80). The intermediate is dissolved with another alcohol before completing the hydrolysis-condensation with a base catalyst. The alcohol in the product gel is supercritically extracted, producing an aerogel. The microstructure of the resulting aerogel is polymeric, as in the acid catalyzed, single-step hydrolysis-condensation reactions.

Neither Brinker nor Schaefer recognize the adverse effects of the alcohol solvent on the hydrolysis-condensation reactions, which are due to re-esterification of the hydrolyzed species in the presence of excess alcohol. The presence of alcohol in the reactions affects the reaction rates and the degree of polymerization of the condensing gel, which also affects gel morphology. The presence of alcohol limits the gelation process to preclude the formation of aerogels of very low densities, less than 0.02 g/cm$^3$. The present invention provides a method of producing aerogels with densities less than 0.02 g/cm$^3$ by removing reaction-generated alcohol and introducing a nonalcoholic solvent to prevent the reverse reactions.

SUMMARY OF THE INVENTION

The present invention is a two-step method for producing metal oxide aerogels or porous glasses of any predetermined density. These aerogels have a unique combination of properties: mechanical strength, transparency, clarity, moisture stability, high porosity, and low thermal conductivity. Accordingly, the objectives of the present invention include:

- to provide metal oxide aerogels and porous glasses of any density, including densities less than 0.02 g/cm$^3$ and greater than 0.30 g/cm$^3$;
- to provide moisture stable (hydrophobic) metal oxide aerogels and porous glasses, to obviate the need for protective coatings or seals;
- to provide metal oxide aerogels and porous glasses which exhibit mechanical strength and very low thermal conductivity, making these materials advantageous for insulation purposes;
- to provide metal oxide aerogels and porous glasses that are transparent and have high clarity;
- to provide a method for forming metal oxide aerogels and porous glasses which require shorter gelation times than conventional methods; and
- to provide a partially condensed metal intermediate that can be stored and from which aerogels or porous glasses of any density may be formed.

The two-step reaction method of the present invention requires mixing highly purified metal alkoxide with a substoichiometric amount of water, an additive, and an alcohol solvent. The additives control the rate of hydrolysis. An acid catalyst is added to the solution to produce an oligomeric mixture of partially condensed metal intermediate. As the hydrolysis reaction proceeds, all reaction-generated and added solvent alcohol is removed.

A nonalcoholic solvent is then added to the partially condensed metal intermediate, and reacted with another catalyst and an amount of water sufficient to complete the hydrolysis-condensation reactions. The solvated, condensed metal intermediate is cast to form a gel at ambient temperature. The gel is then subjected to either direct extraction of the nonalcoholic solvent within the gel pores, or an exchanged liquefied gas is supercritically extracted to form an aerogel.

The present invention recognizes the importance of controlling the molar ratio of water to metal alkoxide to produce aerogels of any density. The water content is limited to a substoichiometric amount in the first step to prevent polymerization from proceeding too far, resulting in gelation before the second step. The present invention emphasizes the use of highly purified reagents, especially of the metal alkoxide, to carefully control the amount of water introduced into the reaction. The purity of the alkoxide determines the quantity of added distilled water. The present invention provides a method for controlling the polymerization process by carefully choosing the purity and amount of reagents, and by introducing additives to further manipulate the rates of reaction.

The present method also takes into account that the presence of excess alcohol in the sol limits the ultimate density range of the resulting aerogels. Both the solvent alcohol and reaction-generated alcohol, created during the formation of a partially condensed metal intermediate, must be removed to make ultralow density aerogels. A nonalcoholic solvent is added to the intermediate to inhibit reverse equilibrium reactions and to prevent gelation during storage.

Low density gels are formed from the partially condensed intermediate when reacted with a second catalyst, water, and a nonalcoholic solvent. The present method improves on conventional techniques by significantly reducing gelation time; gelation usually takes less than 72 hours, as compared with several weeks for gels made by the single-step method.

The dilution of the stored intermediate with a nonalcoholic solvent, water, and catalyst produces a gel whose structural integrity is undamaged by the drying process. Direct supercritical extraction of the residual and diluting solvents, involving temperatures and pressures greater than the critical point of the nonalcoholic solvent, yields an aerogel that is hydrophobic and less susceptible to damage by exposure to atmospheric moisture. Conversely, aerogels produced by prior art methods, such as Tewari, which extracts $CO_2$ at a critical temperature less than alcohol, have a hygroscopic surface character and must be sealed to prevent uptake of moisture.

DETAILED DESCRIPTION OF THE INVENTION

The present invention is a method for rapidly producing stable, transparent metal oxide aerogels or porous glasses of any predetermined density. Densities of less than 0.02 g/cm$^3$ and greater than 0.30 g/cm$^3$ are achievable by specific selection of reagents and processing steps. The method produces an aerogel with a unique microstructure that is among the lightest of man-made materials. The metal oxide aerogels have improved transparency and clarity, increased thermal insulation capacity, and greater mechanical strength than conventional aerogels. Transparent aerogel monoliths as large as 5 centimeters in diameter and 40 centimeters in length have been produced by the present method, and the method can be scaled to even larger product sizes.

Preparation of Aerogels

The present method is a two-step process in which high purity metal alkoxide is mixed with water, an additive, and an alcohol solvent in the presence of an acid catalyst. The reactants undergo the hydrolysis and condensation reactions given in Equations [1] and [2]. The hydrolysis reaction [1] is controlled by refluxing and forms a partially hydrolyzed, partially condensed metal intermediate in solution.

The present method can be used to make an aerogel with any metal that can form an alkoxide, which includes virtually the whole periodic table of the elements. The choices of metals that form alkoxides include silicon, germanium, tantalum, zirconium, boron, titanium, iron, magnesium, strontium, praseodymium, erbium, cerium, lithium, and aluminum. Corresponding metal alkoxide starting reagents include $Ge(OC_2H_5)_4$, $Ta(OC_3H_7)_4$, $Zr(OC_3H_7)_4$, $B(OCH_3)_5$, $Ti(OC_2H_5)_4$, $Al(sec.butoxide)_3$, $Si(OCH_3)_4$, $Si(OC_2H_5)_4$, $Fe(OC_2H_5)_3$, and $Li(OCH_3)$.

The metal alkoxides must be highly purified, at least 98%. This high purity assures that a negligible amount of water will be introduced to the starting mixture by the metal alkoxide reagent, and that the metal alkoxide has not already reacted with atmospheric water to form low molecular weight oligomers. Additionally, high purity starting reagents ensure an accurate water addition, thereby avoiding unwanted gelation in the first step. The amount of water must be carefully controlled, as the molar ratio of water and metal alkoxide is an important factor in determining the final aerogel microstructure.

A substoichiometric amount of water is mixed with the metal alkoxide. The water may be added directly, or the water may be formed during mixing (refluxing) by the reaction of the alcohol solvent and the additive, as in the preparation of a zirconia aerogel in Example 3. The amount of water is crucial to form polymeric chains of hydrolyzed metal of the optimum length and to control the rate of polymerization. Producing chains of optimum length allows the operator to set the desired aerogel density by adding a predetermined amount of nonalcoholic solvent to the partially condensed metal intermediate.

Additives are added to further control the rate of the hydrolysis-condensation reactions and are particularly important for forming metal oxide aerogels other than silicon. Additives are introduced in the initial mixing step before any water addition. (No water addition may be required if the appropriate amount of water is formed through the reaction of the additive and alcohol solvent.) The additives may act as chelating agents to slow the rate of hydrolysis and prevent precipitate formation. Suitable additives include acetylacetone ($CH_3COCH_2COCH_3$) and other substituted acetylacetones, acetic acid ($CH_3COOH$), and hydrogen peroxide ($H_2O_2$).

The solvent alcohol is preferably of high purity to control the amount of water added to the starting mixture. The alcohol increases the miscibility of water and metal alkoxide. The choice of alcohol solvent includes methanol, ethanol, propanol, butanol, and higher alkane alcohols; the preferred alcoholic solvent is methanol.

The acid catalyst is added to adjust the pH of the solution. The choice of acid catalyst includes hydrochloric acid (HCl), nitric acid ($HNO_3$), sulfuric acid ($H_2SO_4$), and acetic acid ($CH_3COOH$); the preferred acid catalyst is HCl.

The alcohol, both the added solvent and reaction-generated, is removed from the partially condensed metal intermediate by distillation. The alcohol is removed to inhibit the reverse equilibrium reactions, thereby maximizing the molecular weight of partially condensed metal intermediate.

The partially condensed metal intermediate may be used to form metal oxide aerogels of any selected density. The density of the gel, and thus the aerogel, is controlled by diluting the intermediate with a selected volume of nonalcoholic solvent. The condensed intermediate is diluted with a nonalcoholic solvent and mixed with a selected amount of water and a second catalyst to complete the hydrolysis-condensation step and to form a condensed metal oxide product. Because the intermediate is already partially condensed, gelation is relatively rapid even at high dilutions.

The choices of nonalcoholic solvent include acetone, ether, acetonitrile, ethylene glycol, dimethylformamide (DMF), tetrahydrolfuran, and toluene; acetonitrile is preferred. The selection of a nonalcoholic solvent is made recognizing that the presence of alcohol limits the molecular construction and density of the gel when metal oxide components are very dilute.

The second catalyst can be a base, such as ammonia ($NH_4OH$), sodium hydroxide (NaOH), potassium hydroxide (KOH), or gaseous ammonia; the preferred base catalyst is ammonia. The base catalysts work well for silica aerogels. The second catalyst can also be an inorganic acid, such as hydrochloric acid (HCl), fluoroboric acid ($HBF_4$), sulfuric acid ($H_2SO_4$), and nitric acid ($HNO_3$); the preferred acid catalyst is fluoroboric acid. The acid catalysts are suitable for making silica aerogels, and may be necessary for making metal oxide aerogels other than silicon, since the base catalysts can cause precipitation problems for non-silica aerogels. The amount of catalyst regulates the pH of the solution and determines the rate of gel formation, which affects aerogel microstructure, strength, and density.

After the second mixing is complete, the condensed metal oxide product is cast, that is, poured into a mold to form a wet gel. Typically, gelation takes place at ambient temperatures in less than 72 hours. This short gelation time is preferred to the several weeks required for the gelling of aerogels prepared by alcohol diluted gels using conventional methods.

The nonalcoholic solvent and any reaction-generated alcohol may be removed by several processes, including supercritical extraction, freeze drying, or evaporation. The nonalcoholic solvent can be supercritically extracted by one of two methods: direct supercritical extraction of nonalcoholic solvent, or substitution of the nonalcoholic solvent with a liquefied gas, which is then supercritically extracted. Direct supercritical fluid extraction in an autoclave is preferred because the resulting aerogel is hydrophobic and stable in the atmosphere.

In the direct supercritical extraction process, the nonalcoholic solvent is removed without causing large capillary forces, which would tend to collapse the gel structures. The wet gel is placed in a reaction vessel and subjected to temperatures in the range of 250° C.–315° C., and pressures of approximately 2000 psi, which are sufficient to raise the nonalcoholic solvent and any residual alcohol solvent above their critical points. The supercritical vapor is released from the vessel, and the dried aerogel is cooled to room temperature with flowing air.

An inert gas may be added to the vessel to provide collateral pressure to achieve the critical pressure of the nonalcoholic solvent. The inert gases suitable to provide pressure include argon and nitrogen; argon is preferred. The use of an inert gas limits the amount of additional solvent needed to produce the supercritical pressure conditions.

In the second method of extraction, the nonalcoholic solvent is exchanged with a liquefied gas, which is then supercritically extracted. Gases suitable for this substitution include carbon dioxide, propane, and chlorofluorocarbons (CFCs or freons).

The structure and surfaces of low density aerogels are best preserved and stabilized against the effects of moisture during direct removal of the nonalcoholic solvent under supercritical conditions, whereby the surface hydroxyl groups are esterified. The direct removal of solvent produces an aerogel with a hydrophobic surface character. Direct supercritical extraction does not require a late step replacement of solvents after gel formation is complete and therefore conserves time in producing the finished aerogel product.

Substitution of the nonalcoholic solvent for a liquefied gas before supercritical extraction produces an aerogel that is hydrophilic and as such absorbs moisture when exposed to humid air. Replacement of the nonalcoholic solvent after gel formation is especially detrimental for ultralow density aerogels and causes irreversible shrinkage when exposed to atmospheric conditions. However, if a hygroscopic aerogel is desired, then supercritical extraction of a liquefied gas solvent is a suitable method.

Characterization of the Condensed Silica Intermediate

Figure 1:
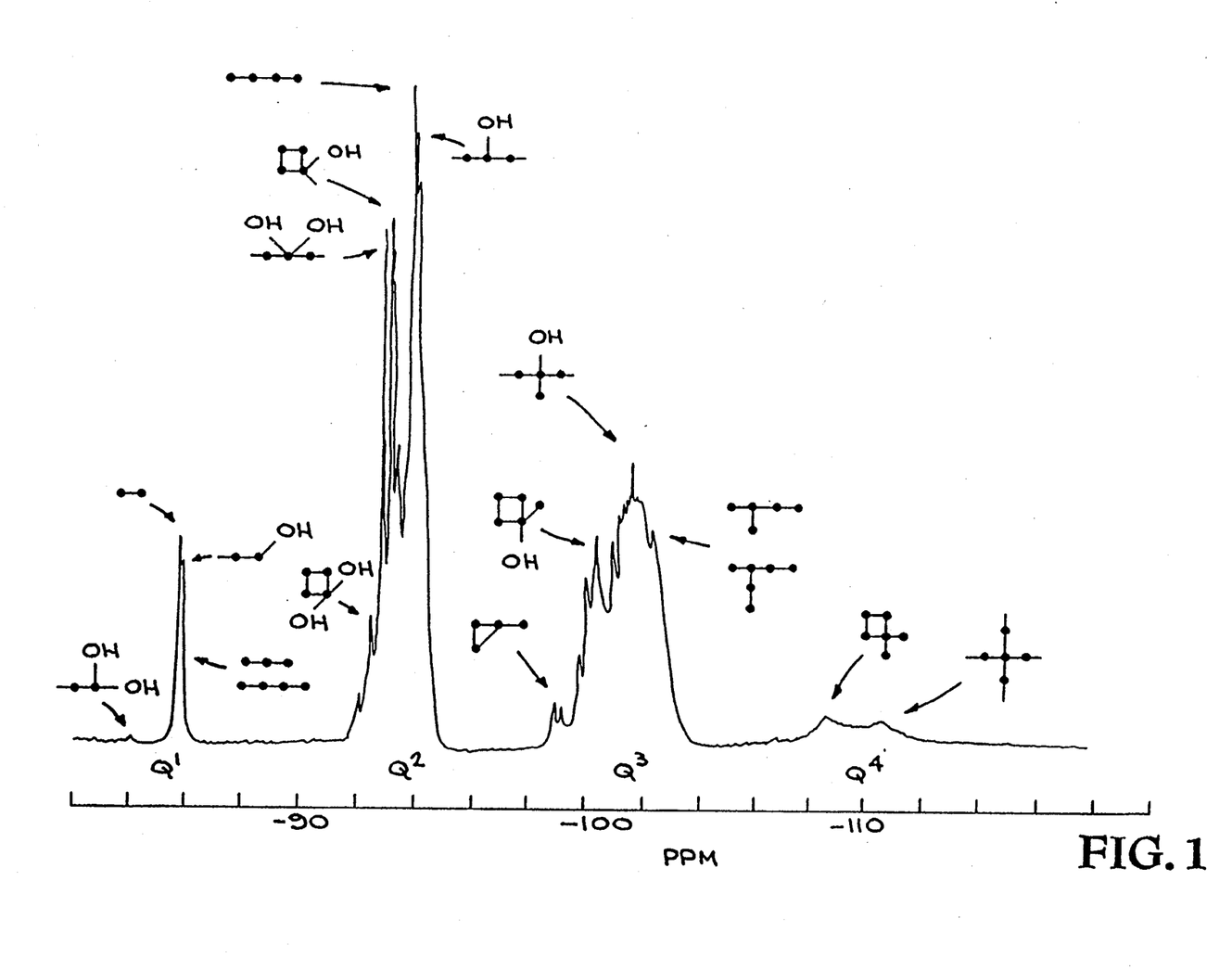
FIG. 1. $^{29}$Si Nuclear Magnetic Resonance (NMR) spectrum of condensed silica intermediate produced as described in Example 1.

A condensed silica was evaluated with $^{29}$Si NMR and by GC/MS to determine the type and distribution of the polysilicate species. FIG. 1 is an example of the NMR spectrum of the condensed silica product intermediate. Assignments from the published literature are used to associate peaks with the denoted structures. The Q notation describes the silicic acid and ester structures by using a superscript to refer to the number of silicon atoms bonded to the atom under consideration. The schematic representation of the species shows the silicon atoms as dots, and oxygen atoms are included in the line connecting the dots.

The NMR spectrum shows that condensation forms small linear chains and cyclic trimers and tetramers. Only trace amounts of fully linked species are present. Line broadening within the peaks denotes a wide distribution of molecular weights.

Figure 2:
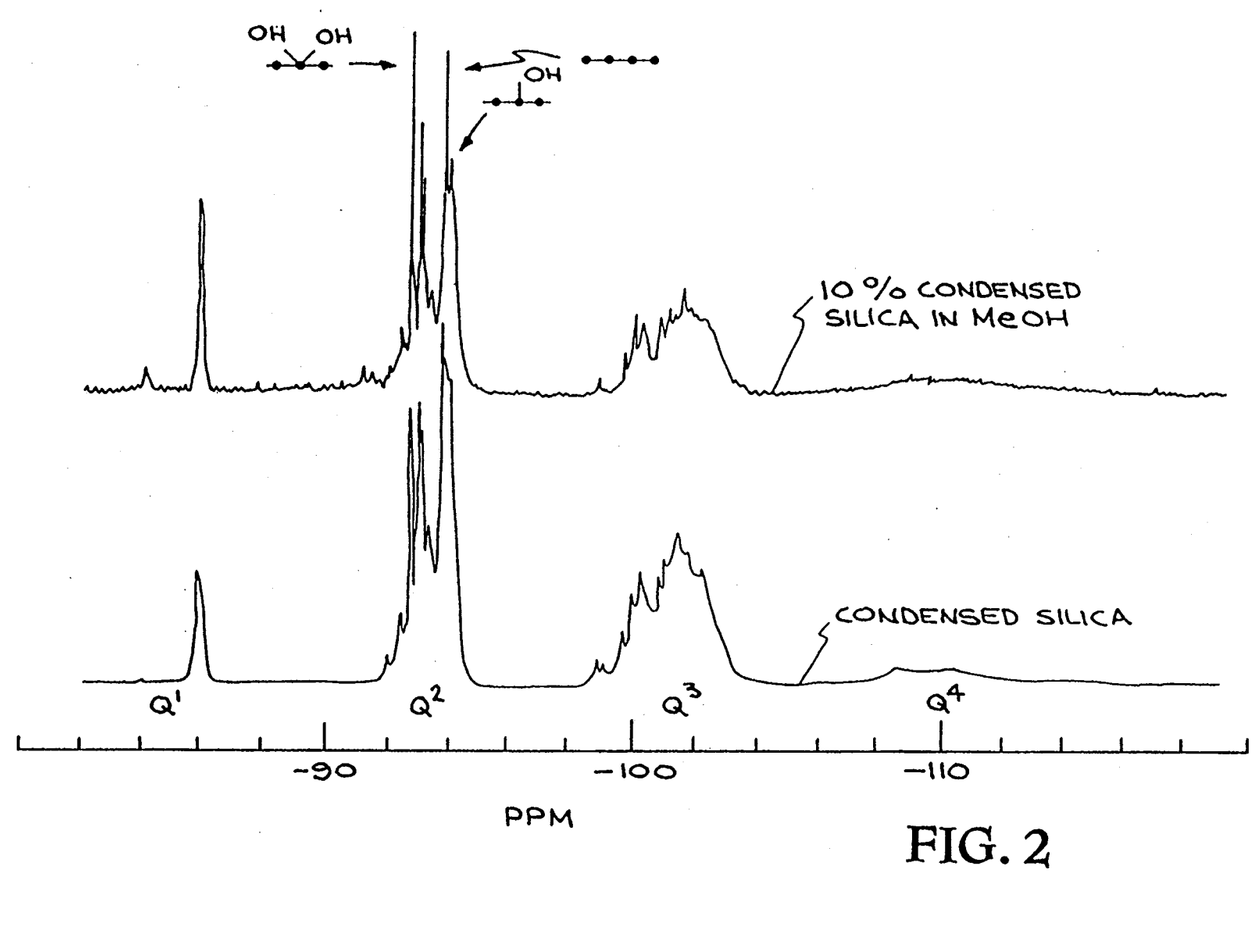
FIG. 2. $^{29}$Si NMR spectrum of condensed silica intermediate, showing that esterification reactions occur in the methanol condensed silica intermediate mixture, but not in the mixture diluted with a nonalcoholic solvent.
Figure 2A:
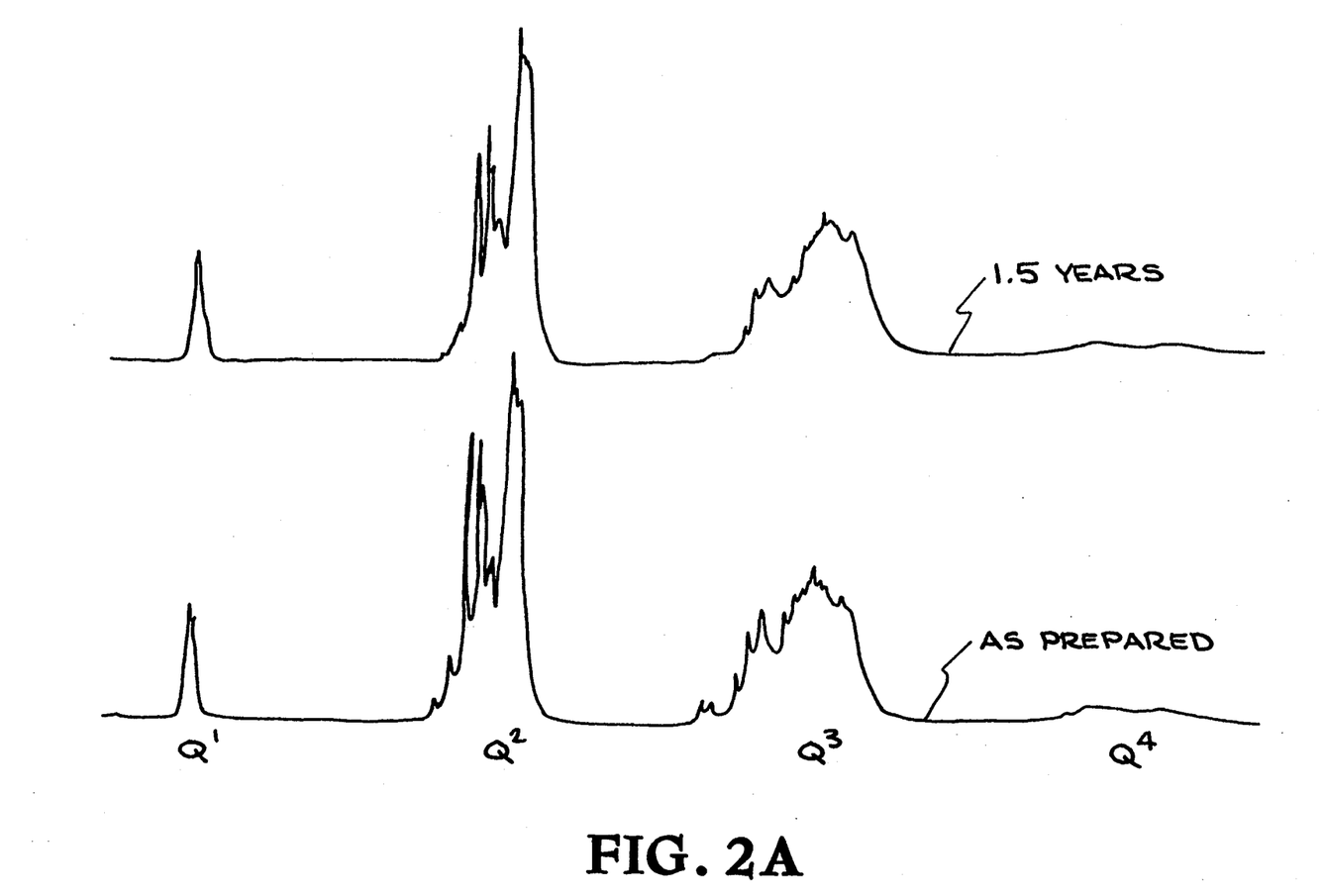
FIG. 2A. $^{29}$Si NMR spectrum of the condensed silica intermediate stored in a sealed vessel for 1.5 years showing no significant change from the freshly prepared intermediate.

Further $^{29}$Si analysis demonstrates the re-esterification of the condensed silica (CS) in the presence of methanol. FIG. 2 shows in the $Q^2$ region that the singularly hydroxylated linear oligomer decreases with a concurrent increase of the fully esterified species. Similar effects were found for the other Q regions (not shown). Condensed silica stored in nonalcoholic solvents does not show any significant change with this type of analysis. Also, as shown in FIG. 2A, CS stored in a sealed vessel for 1.5 years showed no significant change from the freshly prepared CS.

Figure 3:
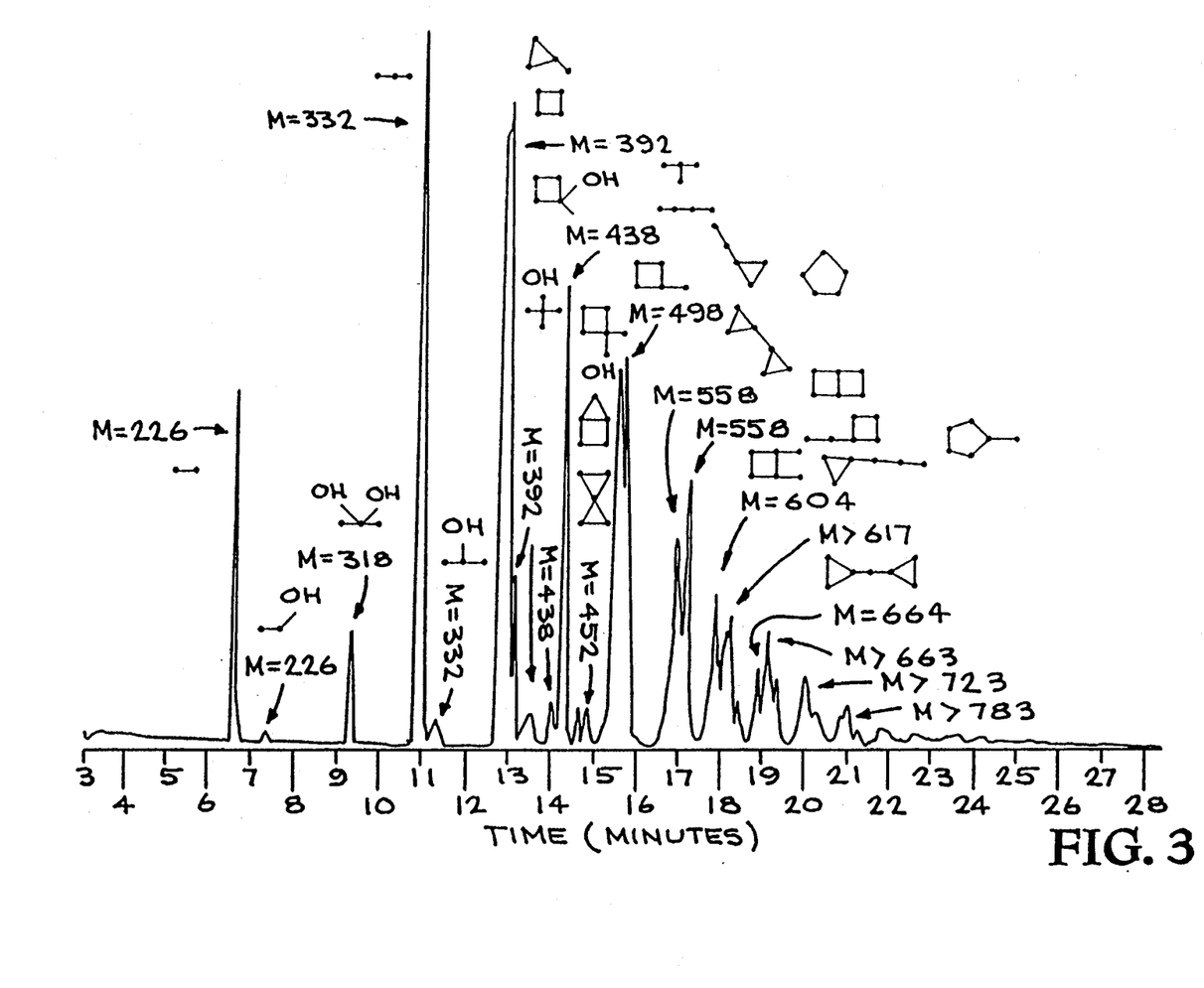
FIG. 3. GC/MS profile of condensed silica intermediate, showing an abundance of cyclic tetramer and cyclic trimer species.

FIG. 3 shows a typical GC/MS profile for the condensed silica intermediate. The data suggest that small linear chains and cyclic trimers and tetramers are formed, in agreement with the NMR results. The relative peak areas show that the cyclic tetramers and trimers, which have one additional siloxane linkage, are the most abundant oligomeric species present in the condensed silica intermediate. The next most abundant species is formed by addition of one siloxane linkage to these oligomers. Further reactions to add more siloxane linkages result in ring closure and yield double trimer or tetramer (ladder-like) structures, which are the third most abundant species. Linear species with more than four siloxane linkages were not detected.

Further analyses show that the condensed silica intermediate has a refractive index of 1.406, a density of 1.328 g/cm$^3$, and a viscosity of 480 centipoise. Viscosities in this range indicate molecular weights in the 10,000–15,000 range when compared with similar polydimethysiloxane structures. Light scattering results of the CS support this claim.

Aerogel Properties

The properties of the low density silica aerogels made by the present method were analyzed by conventional laboratory analytical techniques. Hydrophobic aerogels, after high temperature supercritical fluid extraction of the solvents, have a composition by weight of about 95% SiO$_2$, 4% C., and 1% H. Some of the hydrogen content, about 0.1%, is due to water molecules adsorbed on the internal surfaces. Hydrophilic aerogels, extracted at low temperature after solvent exchange with liquid carbon dioxide, will typically have a composition by weight of about 99.6% SiO$_2$, 0.4% H, and <0.06% C. The organic content of the conventionally produced silica aerogels can be reduced by heat treating, but the resulting aerogel is hydrophilic and hygroscopic.

The densities of the silica aerogels made by the present invention are typically less than about 0.800 g/cm$^3$, which includes densities less than about 0.0015 g/cm$^3$. The refractive index is between 1.0005 and 1.170 when measured at 632.8 nm. The porosity, expressed as the percentage of open space within the total volume, has a range of 64%–99.9%. The specific surface area of these aerogels has a range of 450–1000m$^2$/g. The Young's modulus varies from $4 \times 10^3$ to $2 \times 10^9$ N/m$^2$. The coefficient of thermal expansion is $2-3 \times 10^{-6}$ cm/cm°C. over a temperature range of 20° C. to 80° C. Light transmittance is typically greater than 85% at an optical wavelength of 632.8 nm. The properties of the silica aerogels are also representative of other metal oxide aerogels.

The densities of the silica aerogels made by the present invention are typically less than about 0.800 g/cm$^3$, which includes densities less than about 0.0015 g/cm$^3$. The refractive index is between 1.0005 and 1.170 when measured at 632.8 nm. The porosity, expressed as the percentage of open space within the total volume, has a range of 64%–99.9%. The specific surface area of these aerogels has a range of 450–1000m$^2$/g. The Young's modulus varies from $4 \times 10^3$ to $2 \times 10^9$ N/m$^2$. The coefficient of thermal expansion is $2-3 \times 10^{-6}$ cm/cm°C. over a temperature range of 20° C. to 80° C. Light transmittance is typically greater than 85% at an optical wavelength of 632.8 nm. The properties of the silica aerogels are also representative of other metal oxide aerogels.

Figure 4A:
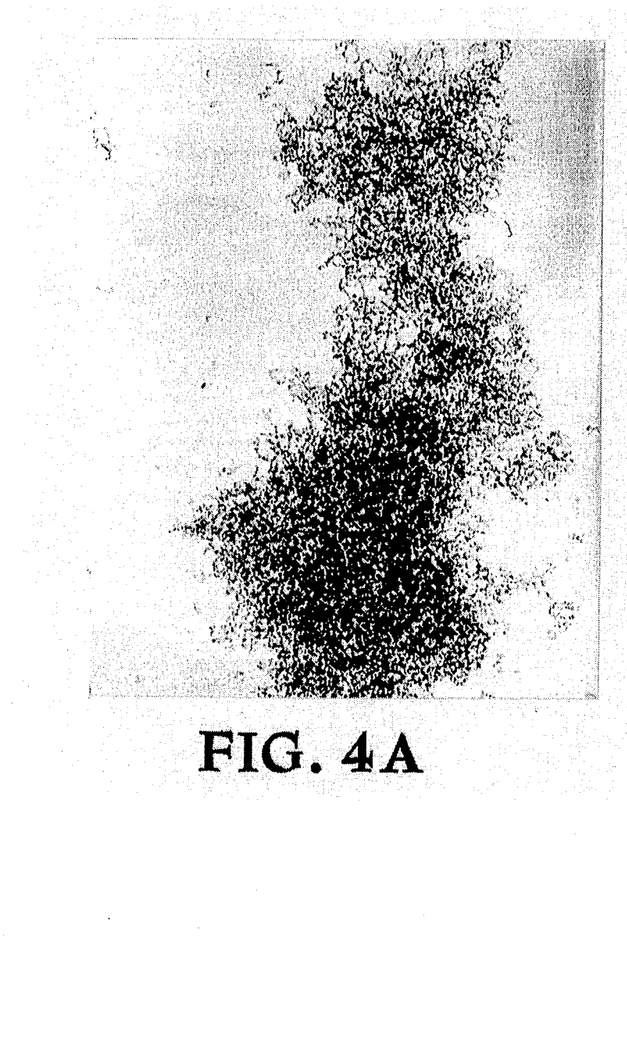
FIGS. 4A and 4B. Transmission Electron Micrographs (TEM) of aerogel of 0.04 g/cm$^3$ density made by the method of the present invention (FIG. 4a) and by a conventional method (FIG. 4b).
Figure 4B:
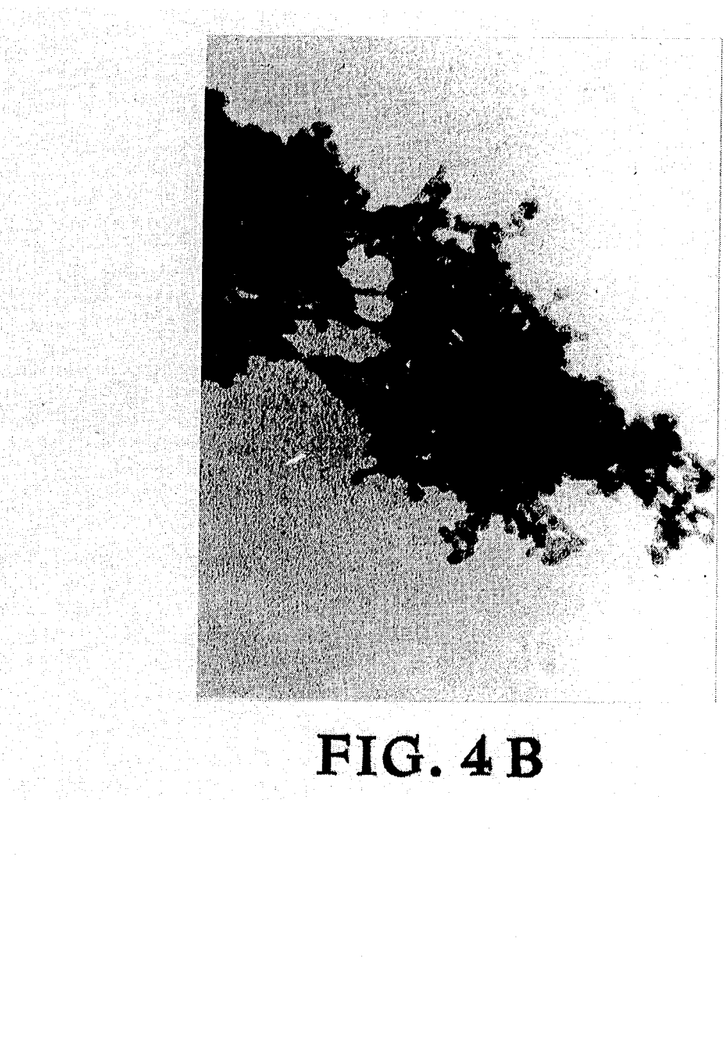

The microstructure of the aerogels made by the present method differs from the microstructure of aerogels made by conventional methods. The structural differences are demonstrated in FIG. 4, which shows transmission electron micrographs (TEM) for both types of aerogels. The micrograph of aerogels of 0.04 g/cm$^3$ density made from the condensed silica intermediate of the present invention (FIG. 4a) shows a chainlike polymeric character. The micrograph of the conventionally made aerogel of the same density (FIG. 4b) shows connected spheroidal particles.

Figure 5:
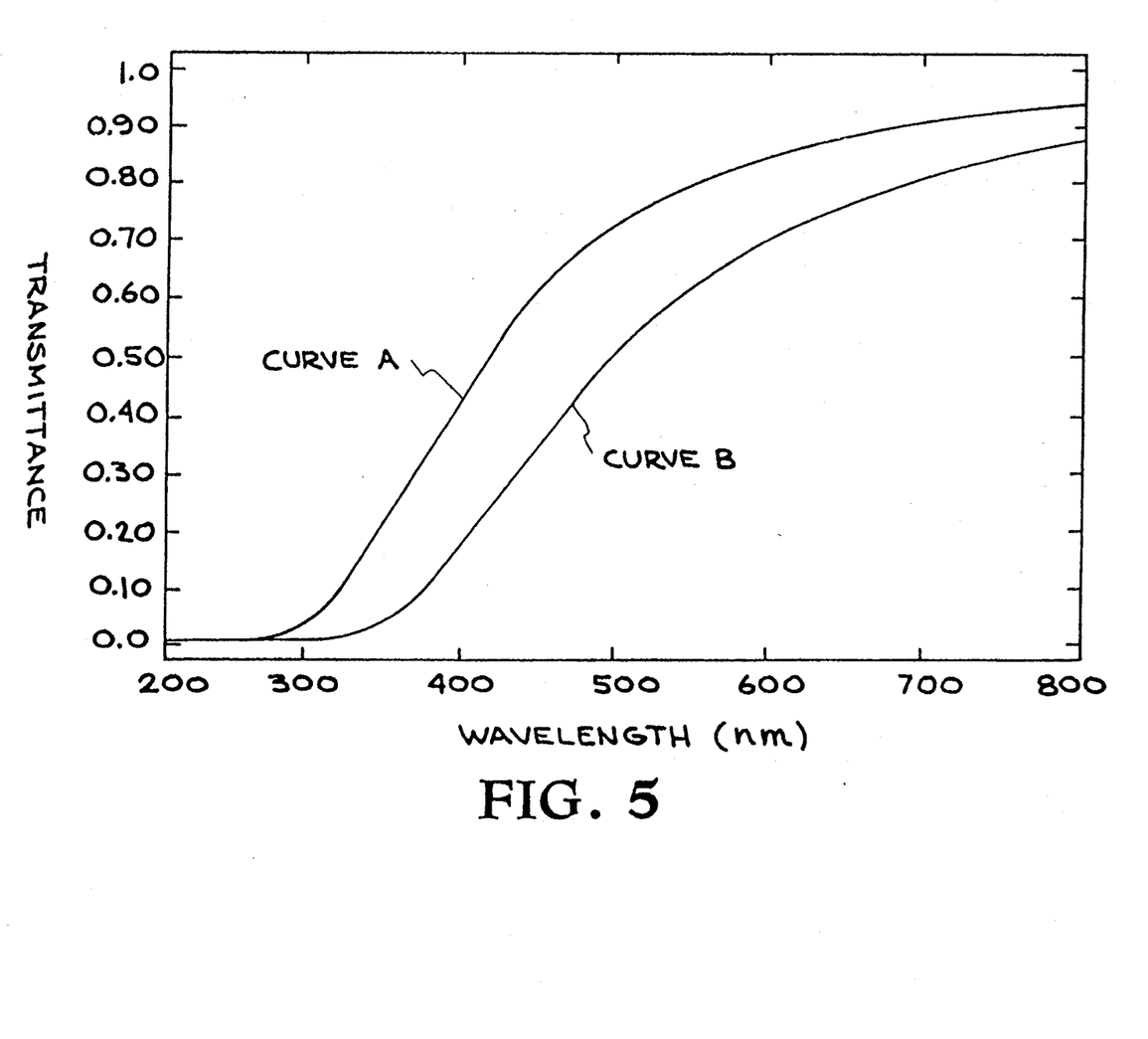
FIG. 5. Light transmission in the visible and ultraviolet regions for aerogels made by the present method and conventional methods.

The microstructural differences affect other properties of the aerogel, such as transparency and compressive strength. For example, the transmissivity of silica aerogels formed by the present method is typically about 15% higher over most of the visible wavelength region than for conventionally derived aerogels of the same bulk density. FIG. 5 shows the UV-VIS transmissivity spectrum for a typical set of aerogels. Curve A shows the transmittance for a monolithic silica aerogel that is 2 cm thick, has a density of 0.05 g/cm$^3$, and was made by the method of the present invention. Curve A is distinctly different from Curve B, which shows the transmittance spectrum of an aerogel of the same thickness and density that was made by the conventional single-step method.

Figure 6:
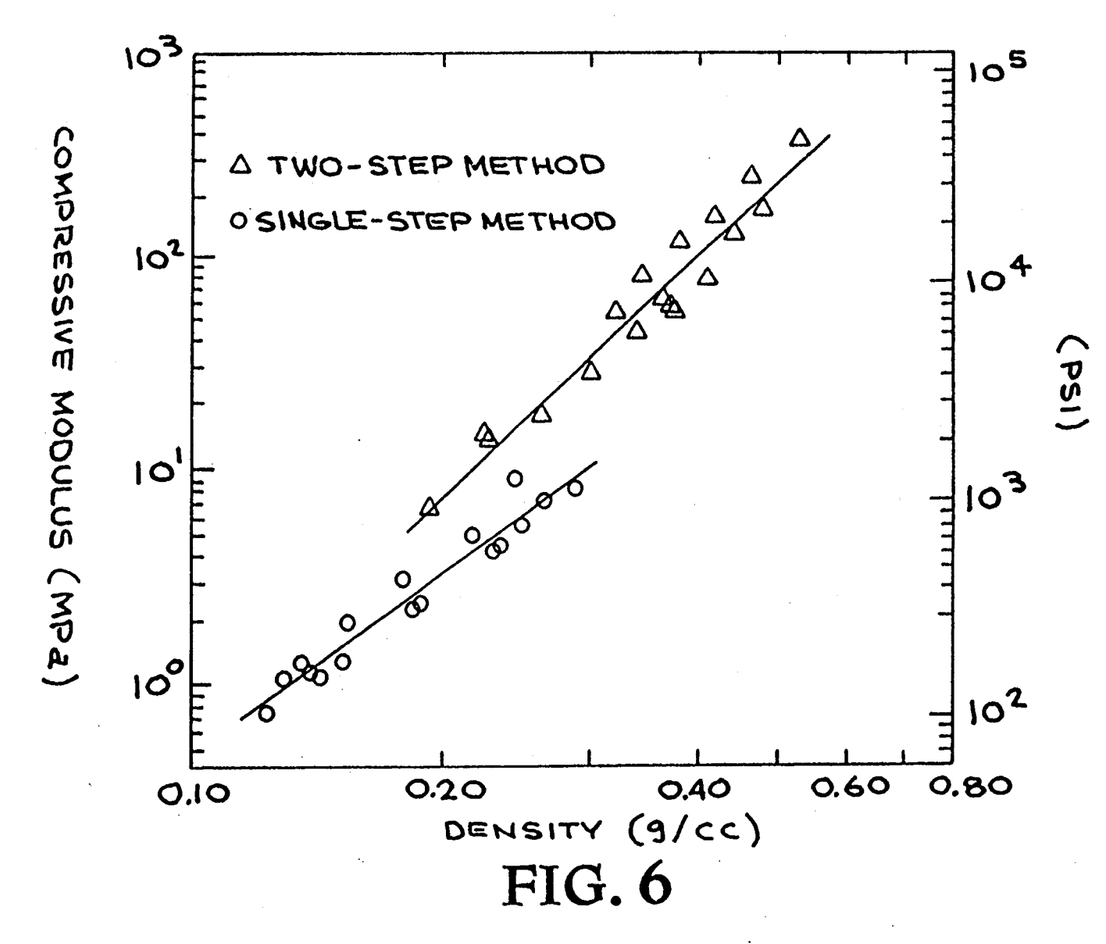
FIG. 6. Compressive modulus for aerogels of comparable densities when made by the present method and conventional methods.

The compressive modulus of condensed silica intermediate derived aerogels is about three times larger than conventionally derived aerogels for all densities presently measured. FIG. 6 shows the compressive modulus for several representative samples of both types of aerogels. Aerogels of the present method are represented by open triangles, and aerogels made by conventional processes are represented by open circles.

Theoretical models developed for the thermal conductivity of monolithic silica aerogels show that the solid conductivity of silica aerogel varies with density to the 1.8 power ($C \propto \rho^{1.8}$) (Buttner et al., "Thermal Conductivity in SiO$_2$-Aerogel Tiles," in *Aerogels*, Springer-Verlag, New York (1986), pp. 104–109). Thus, aerogels made by the present invention with bulk densities less than 0.02 g/cm$^3$ will have lower solid thermal conductivity than aerogels made by conventional methods.

Inorganic impurities may result from the high temperature autoclaving process. A copper impurity of about 20 ppm is found in silica aerogels extracted in an autoclave using a copper D-ring seal. Other possible contamination can result from the use of thread lubricants with the autoclave. Typically, the aerogels produced contain no impurities above the minimum detectable levels of atomic absorption spectrometry.

EXAMPLE 1

Preparation of Condensed Silica Intermediate

The following example refers to silicon alkoxide chemistry as an embodiment of this invention, wherein silicon alkoxide is the metal alkoxide used to produce a silica aerogel of desired density. However, the present technique is used to make other metal oxide aerogels from other metal alkoxide starting materials. Conventional methods of hydrolysis-condensation used to make silica aerogels have also been used in production of aerogels from other metal alkoxides (Teichner et al., *Advances in Colloid and Interface Science* 5:245–273 (1976)).

In one embodiment of the present method, silicon alkoxide in the form of tetramethoxysilane (200 grams) is mixed with methanol (100 grams) and water (30 grams). The alkoxide is purchased from Dynasil, Inc. and is purified by distillation. All reagents, particularly the metal alkoxide, must be of high purity and free of contaminants. A hydrochloric acid catalyst (200–800 μl) is added to the solution, and the mixture reacts in a refluxing apparatus for about 16 hours.

A substoichiometric amount of water is added; the molar ratios of the reagents are about 1TMOS: 2.4MeOH: 1.3H$_2$O. This amount of water represents 65% of what is needed to form SiO$_2$ by the hydrolysis-condensation reactions of Equations [1] and [2]. The substoichiometric amount insures that the reaction produces silicon chains of the optimum length, which can then be polymerized to form aerogel of the desired density.

All alcohol, both the initial reagent and reaction-generated, is removed by distillation at 67–70° C. in 2–3 hours, producing about 253 ml of distillate. The bath temperature is maintained at 100° C. during the distillation. Many variations in methods involving the distilling process can result in a condensed silica intermediate acceptable for the purpose of making silica aerogels. The important factor is that all alcohol is removed to prevent reverse reactions from occurring; otherwise, the full range of aerogel densities cannot be achieved.

The partially condensed silica intermediate remaining in the refluxing apparatus is diluted to at least the starting weight of alkoxide (200 grams) with nonalcoholic solvent, preferably acetonitrile. The nonalcoholic solvent inhibits the back reaction to the silicon alkoxide and permits the condensed silica intermediate to be stored for future use

Preparation of Gels from Condensed Silica Intermediate

The partially condensed silica intermediate, already diluted with acetonitrile, is mixed with an additional quantity of acetonitrile, water, and a catalyst, preferably NH4OH. The intermediate is diluted to form aerogel of any density. The target density for the gel is used to calculate the amount of each added constituent:

$$\text{Target Density} \approx \frac{\text{(Mass of SiO}_2\text{ in condensed intermediate)}}{\text{(Volume of diluent + Volume alcohol from reaction)}}$$

For purposes of this calculation, the mass of silica in the condensed silica intermediate is determined from the molar fraction of TMOS, assuming no loss of silica during the distillation.

For example, to prepare an aerogel with a target density of 0.010 g/cm$^3$, starting with 10 grams of condensed intermediate, the volume of acetonitrile to be added is found by these calculations:

$$\text{Mass of SiO}_2 = \frac{10.0 \text{ g}}{152 \text{ g/mole TMOS}} \times 60 \text{ g/mole SiO}_2 = 3.95 \text{ g}$$

$$\frac{\text{Total}}{\text{volume diluent}} = \frac{\text{mass SiO}_2}{\text{target density}} = \frac{3.95 \text{ g}}{0.010 \text{ g/cm}^3} = 395 \text{ cm}^3$$

Volume MeOH from reaction =

$$\frac{10.0 \text{ g} \times (4 - 2.7)}{152 \text{ g/mole TMOS}} \times \frac{32 \text{ g/mole MeOH}}{0.791 \text{ g/cm}^3 \text{ MeOH}} = 3.3 \text{ cm}^3$$

Volume diluent to add = total volume − reaction volume =

$$(395 - 3.3) \text{ cm}^3 = 391.7 \text{ cm}^3$$

The quantity of water added is 100% excess from that required by reaction. The overall net reaction requires two moles of $H_2O$. Since 1.3 moles are used in the first step, then 2.7 moles are added in the second step. The amount of water to be added is found by this calculation:

Mass of added water =

$$\frac{10.0 \text{ g}}{152 \text{ g/mole TMOS}} \times 18 \text{ g/mole } H_2O \times 2.7 = 3.2 \text{ g}$$

The quantity of concentrated $NH_4OH$ added is 2 ml per liter of condensed silica product solution.

All constituents are mixed together in a common container and stirred for 30 minutes at room temperature. The solution is poured into molds made of glass, metal, polymeric (silicone, polypropylene, polystyrene, Teflon), or ceramic construction. Gelation typically occurs at room temperature within 72 hours. All solvent is removed by direct supercritical fluid extraction at 300° C.

Extraction of Solvent from the Wet Gel

Two methods can be used to extract nonalcoholic solvent and any reaction-generated alcohol from the wet gels. One method is the direct supercritical extraction of the solvent, and the other requires exchange of nonalcoholic solvent by another solvent before extraction.

In direct supercritical extraction, the mold with wet gel sample is placed directly into a pressure vessel capable of withstanding temperatures up to 320° C. and pressures up to 3000 psi. One-half liter of acetonitrile is poured into a vessel with a three liter volume. The vessel is sealed and pressurized to 1500 psi with an inert gas, such as argon or nitrogen. The temperature of the vessel is raised linearly at 0.3° C./minute to an intermediate temperature of 210° C., and then at a rate of 0.2° C./minute to a maximum temperature of 300° C. These conditions are above the critical point for acetonitrile, which is at 295° C. and 780 psi.

The vessel pressure is maintained at 2000 psi during the heat ramp and as the final temperature is held for 30 minutes. The pressure is controlled by means of a pressure relief valve. When drying is complete, the pressure is slowly released at a linear rate of 5 psi/minute. The heaters are turned off and the vessel is allowed to cool to ambient temperature once the vessel reaches atmospheric pressure. The vessel is purged with dried nitrogen gas during the cooling period.

An alternate method for extraction of the nonalcoholic solvent involves solvent exchange using a liquefied gas, such as $CO_2$, chlorofluorocarbons, or propane. A mold containing wet gel is placed in the pressure vessel, sealed, and pre-cooled to 15° C. and pressurized to 800 psi. In the preferred embodiment, liquefied carbon dioxide is transferred into the pressure vessel, and a series of soaks and flushes are performed over 2 to 4 days. This flushing replaces all of the internal solvent with liquid carbon dioxide.

The pressure vessel is heated at a rate of about 0.5° C./minute to a temperature of 45° C., and the pressure is regulated to 1600 psi. The critical point for carbon dioxide is 31° C. and 1180 psi. After 30 minutes, the internal pressure of the vessel is relieved at a rate of about 0.5-30 psi per minute, until atmospheric pressure is attained. The aerogel is removed from the pressure vessel under a continuous flow of inert gas and immediately placed in a desiccated environment, since the resulting aerogel is hydrophilic.

EXAMPLE 2

Preparation of Condensed Titania Intermediate

In another embodiment of the precursor formation, titania alkoxide in the form of titanium isopropoxide (100 grams) is mixed sequentially with acetylacetone (15 grams), isopropyl alcohol (75 grams), and water (6.3 grams). The alkoxide is purchased from Alfa Products. All reagents must be of high purity and free from contaminants. A hydrochloric acid catalyst (200-800 μl) is added to the solution, and the mixture reacts in a refluxing apparatus for about 2 hours.

A substoichiometric amount of water is added; the molar ratios of the reagents are approximately 1Ti-$(OC_3H_7)$: 0.15AcAc: 6.7ROH: 1$H_2O$. The substoichiometric amount of water ensures that the reaction does not proceed to completion, but produces polymeric chains of titania without gelation.

All alcohol, both the initial reagent and reaction-generated, is removed by distillation in 2-3 hours, producing about 123 ml of distillate. The partially condensed titania intermediate remaining in the reaction vessel is diluted to at least the starting weight of the alkoxide (100 grams) with a nonalcoholic solvent, preferably acetone.

Titania gels and aerogels are prepared by the same procedures as used for the partially hydrolyzed, partially condensed silica intermediate. The preferred catalyst and solvent in the second step are fluoroboric acid ($HBF_4$) and acetone, respectively. Many variations in methods involving the mixing, refluxing, and distilling process can result in a condensed titania intermediate acceptable for the purpose of making titania aerogels.

EXAMPLE 3

Preparation of Condensed Zirconia Intermediate

In another embodiment of the precursor formation, zirconia alkoxide in the form of zirconia n-propoxide (60 grams) is mixed with acetic acid (16 grams) and propanol (24 grams) and refluxed for about 3-4 hours. No water is added to the refluxing mixture, but water is generated from the reaction between the acetic acid and propanol. After refluxing, the precursor is collected and stored for use.

Zirconia gels and aerogels are prepared by the same procedures as used for the partially hydrolyzed, partially condensed silica intermediate. The preferred catalyst and solvent in the second step are fluoroboric acid ($HBF_4$) and propanol, respectively. Many variations in methods involving the mixing, refluxing, and distilling process can result in a condensed zirconia intermediate acceptable for the purpose of making zirconia aerogels.

The foregoing descriptions of the preferred embodiments of the invention are presented for purposes of illustration and description and are not intended to be exhaustive or to limit the invention to the precise form disclosed. Many modifications and variations are possible in light of the above teaching. The scope of the invention is defined by the following claims.

We claim:

1. A two-step reaction method for making metal oxide aerogels and porous glasses, comprising:
   (a) mixing a metal alkoxide with a hydrolysis rate reducing alcohol solvent, an additive, and a substoichiometric amount of water to form a solution;

(b) reacting the metal alkoxide solution with an acid catalyst to form an oligomeric mixture of a partially condensed metal intermediate and a reaction-generated alcohol;

(c) removing all reaction-generated and solvent alcohol;

(d) adding a nonalcoholic solvent to the partially condensed metal intermediate to form a nonalcoholic solvated condensed metal intermediate;

(e) reacting the nonalcoholic solvated condensed metal intermediate with a second catalyst and water to complete hydrolysis to form a condensed metal oxide product;

(f) forming a gel from the condensed metal oxide product; and (g) removing the nonalcoholic solvent from the gel to form an aerogel.

2. A method as recited in claim 1, wherein the metal alkoxide is formed from a metal selected from the group consisting of silicon, zirconium, titanium, tantalum, germanium, boron, aluminum, strontium, iron, praseodymium, erbium, cerium, lithium, and magnesium.

3. A method as recited in claim 2, wherein the silicon alkoxide is selected from the group consisting of tetramethoxysilane, tetraethoxysilane, tetrapropoxysilane, and tetrabutoxysilane.

4. A method as recited in claim 1, wherein the metal alkoxide is of a purity greater than 98%.

5. A method as recited in claim 1, wherein the additive in Step (a) is selected from the group consisting of acetylacetone and any substituted acetylacetones, acetic acid, and hydrogen peroxide.

6. A method as recited in claim 1, wherein the alcohol solvent in Step (a) is selected from the group consisting of methanol, ethanol, propanol, butanol, and higher alkane alcohols.

7. A method as recited in claim 1, wherein the acid catalyst in Step (b) is selected from the group consisting of hydrochloric acid (HCl), nitric acid ($HNO_3$), sulfuric acid ($H_2SO_4$), and acetic acid ($CH_3COOH$).

8. A method as recited in claim 1, wherein the removal of alcohol in Step (c) is performed by a method selected from the group consisting of distillation and evaporation.

9. A method as recited in claim 1, wherein the nonalcoholic solvent of Step (d) is selected from the group consisting of acetonitrile, acetone, ether, ethylene glycol, dimethylformamide, tetrahydrolfuran, and toluene.

10. A method as recited in claim 1, wherein the second catalyst in Step (e) is selected from the group consisting of ammonia ($NH_4OH$), sodium hydroxide (NaOH), potassium hydroxide (KOH), gaseous ammonia, fluoroboric acid ($HBF_4$), hydrochloric acid (HCl), nitric acid ($HNO_3$), and sulfuric acid ($H_2SO_4$).

11. A method as recited in claim 1, wherein the removal of nonalcoholic solvent in Step (g) is performed by a method selected from the group consisting of supercritical fluid extraction, freeze-drying, and evaporation.

12. A method as recited in claim 11, wherein a supercritical extraction of the solvent is performed using an inert gas.

13. A method as recited in claim 1, wherein the removal of nonalcoholic solvent in Step (g) comprises:

(1) exchanging the nonalcoholic solvent for a liquefied gas; and (2) extracting the liquefied gas by a method selected from the group consisting of supercritical fluid extraction, freeze-drying, and evaporation.

14. A method as recited in claim 13, wherein the liquefied gas is selected from the group consisting of carbon dioxide, chlorofluorocarbons, and propane.

15. A method as recited in claim 1, wherein the water in Step (a) is formed from the reaction between the alcohol solvent and the additive during mixing.

16. A method as recited in claim 1, wherein the alcohol solvent and additive react to form the substoichiometric amount of water.

17. A method for forming a partially condensed metal intermediate that can be stored and used to form an aerogel of a predetermined density, comprising:

(a) mixing a metal alkoxide with a hydrolysis rate reducing alcohol solvent, an additive, and a substoichiometric amount of water to form a solution;

(b) reacting the metal alkoxide solution with an acid catalyst to form an oligomeric mixture of a partially condensed metal intermediate and a reaction-generated alcohol;

(c) removing all reaction-generated and solvent alcohol; and (d) diluting the partially condensed metal intermediate with a nonalcoholic solvent.

18. A method as recited in claim 17, wherein the metal alkoxide is formed from a metal selected from the group consisting of silicon, zirconium, titanium, tantalum, germanium, boron, aluminum, strontium, iron, praseodymium, erbium, cerium, lithium, and magnesium.

19. A method as recited in claim 17, wherein the metal alkoxide is of a purity greater than 98%.

20. A method as recited in claim 17, wherein the additive in Step (a) is selected from the group consisting of acetylacetone and any substituted acetylacetones, acetic acid, and hydrogen peroxide.

21. A method as recited in claim 17, wherein the alcohol solvent in Step (a) is selected from the group consisting of methanol, ethanol, propanol, butanol, and higher alkane alcohols.

22. A method as recited in claim 17, wherein the acid catalyst in Step (b) is selected from the group consisting of hydrochloric acid (HCl), nitric acid ($HNO_3$), sulfuric acid ($H_2SO_4$) and acetic acid ($CH_3COOH$).

23. A method as recited in claim 17, wherein the removal of alcohol in Step (c) is performed by a method selected from the group consisting of distillation and evaporation.

24. A method as recited in claim 17, wherein the nonalcoholic solvent of Step (d) is selected from the group consisting of acetonitrile, acetone, ether, ethylene glycol, dimethylformamide, tetrahydrolfuran, and toluene.

25. A method as recited in claim 17, wherein the water in Step (a) is formed from the reaction between the alcohol solvent and the additive during mixing.

* * * * *